US006988020B2

(12) United States Patent
Inch et al.

(10) Patent No.: US 6,988,020 B2
(45) Date of Patent: Jan. 17, 2006

(54) METHOD AND APPARATUS TO MOVE AN ACCESSOR WITHIN A DATA STORAGE AND RETRIEVAL SYSTEM

(75) Inventors: Randy C. Inch, Tucson, AZ (US); Jonathan E. Bosley, Tucson, AZ (US); John Struble, San Luis Obispo, CA (US); Katherine Tyldesley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 10/713,186

(22) Filed: Nov. 14, 2003

(65) Prior Publication Data

US 2005/0171633 A1   Aug. 4, 2005

(51) Int. Cl.
G06F 7/00 (2006.01)
G05B 19/04 (2006.01)
G05B 19/18 (2006.01)

(52) U.S. Cl. .................. 700/213; 700/214; 700/218; 700/247; 700/250

(58) Field of Classification Search ............... 700/213, 700/214, 218, 245, 246, 247, 250
See application file for complete search history.

(56) References Cited

U.S. PATENT DOCUMENTS

| | | | |
|---|---|---|---|
| 4,775,903 A | 10/1988 | Knowles ...................... 360/78 |
| 5,254,920 A | 10/1993 | Agarwal et al. ............ 318/560 |
| 5,740,327 A | 4/1998 | Funaya ........................ 395/89 |
| 5,770,829 A | 6/1998 | Katz et al. ................. 318/560 |
| 5,917,301 A | 6/1999 | Park ........................... 318/609 |
| 5,963,003 A | 10/1999 | Boyer ......................... 318/574 |
| 5,980,139 A | 11/1999 | Chapman et al. ........... 400/582 |
| 6,002,971 A * | 12/1999 | Lucas ......................... 700/213 |
| 6,101,065 A | 8/2000 | Alfred et al. ............ 360/78.04 |
| 6,102,591 A | 8/2000 | Chapman et al. ............. 400/76 |
| 6,114,825 A | 9/2000 | Katz .......................... 318/615 |
| 6,381,517 B1 * | 4/2002 | Butka et al. ................ 700/247 |

FOREIGN PATENT DOCUMENTS

JP   05026493   2/1993
JP   08217114   8/1996

OTHER PUBLICATIONS

Kishi, et al., IBM Technical Disclosure Bulletin, "Detecting Robots Position in a Multiple Robot Library", Sep. 1994, pp. 281-282.
M. Sendelweck, IBM Technical Disclosure Bulletin, "Top- And Bottom-Driven Robot", Feb. 1992, pp. 455-456.

* cited by examiner

*Primary Examiner*—Gene O. Crawford
(74) *Attorney, Agent, or Firm*—Dale F. Regelman

(57) ABSTRACT

A method to move an accessor capable of accelerating at $a_{MAX}$. The method calculates a first velocity profile where the accessor travels a distance in the minimum time interval. That first velocity profile requires a first maximum acceleration change. The method calculates a second velocity profile, where that second velocity profile includes a second maximum acceleration change, where that second maximum acceleration change is less than the first maximum acceleration change. The method determines if the accessor reaches $a_{MAX}$ using the second velocity profile. If the accessor does not reach $a_{MAX}$ using the second velocity profile, then the method moves the accessor using the first velocity profile. Alternatively, if the accessor does reach $a_{MAX}$ using the second velocity profile, then the method moves the accessor using the second velocity profile.

30 Claims, 13 Drawing Sheets

FIG. 2
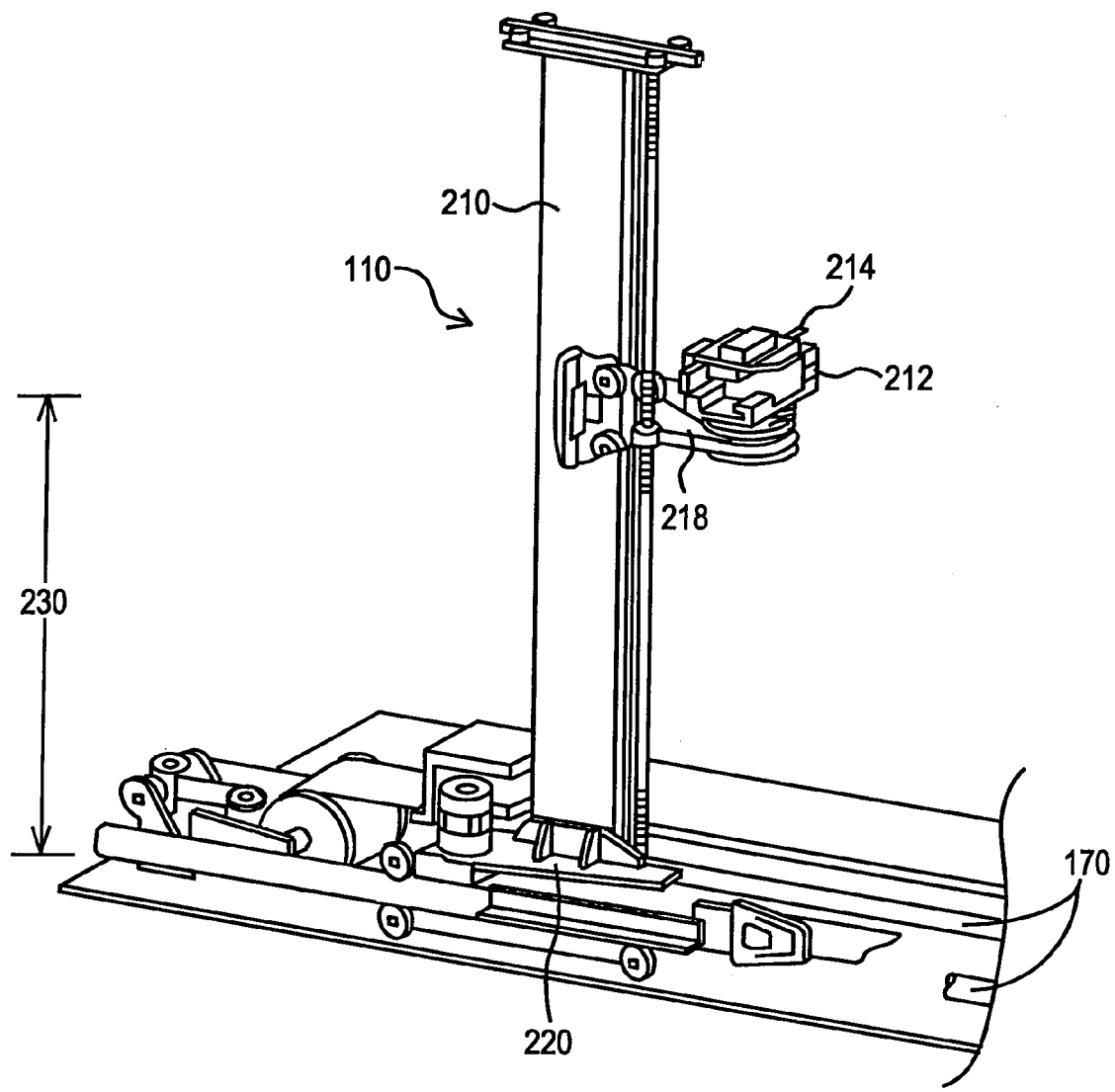
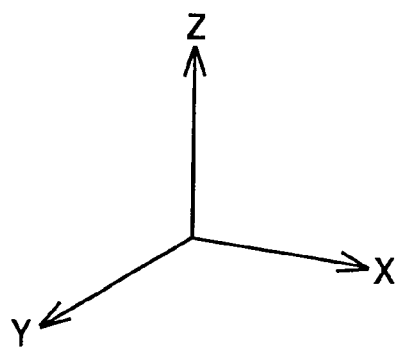

FIRST VELOCITY PROFILE AND SECOND VELOCITY PROFILE

METHOD AND APPARATUS TO MOVE AN ACCESSOR WITHIN A DATA STORAGE AND RETRIEVAL SYSTEM

FIELD OF THE INVENTION

The present invention relates to an apparatus and method to calculate and use a velocity profile to move an accessor within a data storage and retrieval system.

BACKGROUND OF THE INVENTION

Automated media storage libraries are known for providing cost effective access to large quantities of stored media. Generally, media storage libraries include a large number of storage slots on which are stored portable information storage media. The typical portable information storage media is a tape cartridge, an optical cartridge, a disk cartridge, and the like. One (or more) accessor typically accesses the information storage media from the storage slots and delivers the accessed media to a information storage device for reading and/or writing data on the accessed media. Suitable electronics both operate the accessor and operate the information storage devices to transmit and/or receive data from an attached on-line host computer system.

In a conventional automated media storage library, the storage slots are arranged in a planar orthogonal arrangement forming a "wall" of storage slots for holding information storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy.

What is needed is an apparatus and method to move an accessor within a data storage and retrieval system, where that apparatus and method minimizes both the accessor's travel time and undesirable accessor vibrations and/or oscillations caused by rapid acceleration changes. Applicants' invention comprises an apparatus and method to expeditiously move an accessor within a data storage and retrieval system while eliminating most or all accessor vibrations and/or oscillations.

SUMMARY OF THE INVENTION

Applicants' invention includes a method to move an accessor within a data storage and retrieval system. Applicants' method provides an accessor having a velocity control program, where that accessor is capable of accelerating at a maximum acceleration $a_{MAX}$. The method further includes receiving a request to move that accessor a distance from a first location to a second location. Applicants' method calculates a first velocity profile where the accessor travels the distance in the minimum time interval. That first velocity profile requires a first maximum acceleration change. The method then calculates a second velocity profile, where that second velocity profile includes a second maximum acceleration change, and where that second maximum acceleration change is less than the first maximum acceleration change.

The method then determines if the accessor reaches $a_{MAX}$ using the second velocity profile. If the accessor does not reach $a_{MAX}$ using the second velocity profile, then the method loads the first velocity profile into the velocity control program and moves the accessor using that velocity control program. Alternatively, if the accessor does reach $a_{MAX}$ using the second velocity profile, then the method loads the second velocity profile into the velocity control program, and moves the accessor using that velocity control program.

BRIEF DESCRIPTION OF THE DRAWINGS

The invention will be better understood from a reading of the following detailed description taken in conjunction with the drawings in which like reference designators are used to designate like elements, and in which:

FIG. 2 is a perspective view of Applicants' accessor;

DETAILED DESCRIPTION OF THE PREFERRED EMBODIMENTS

Figure 1:
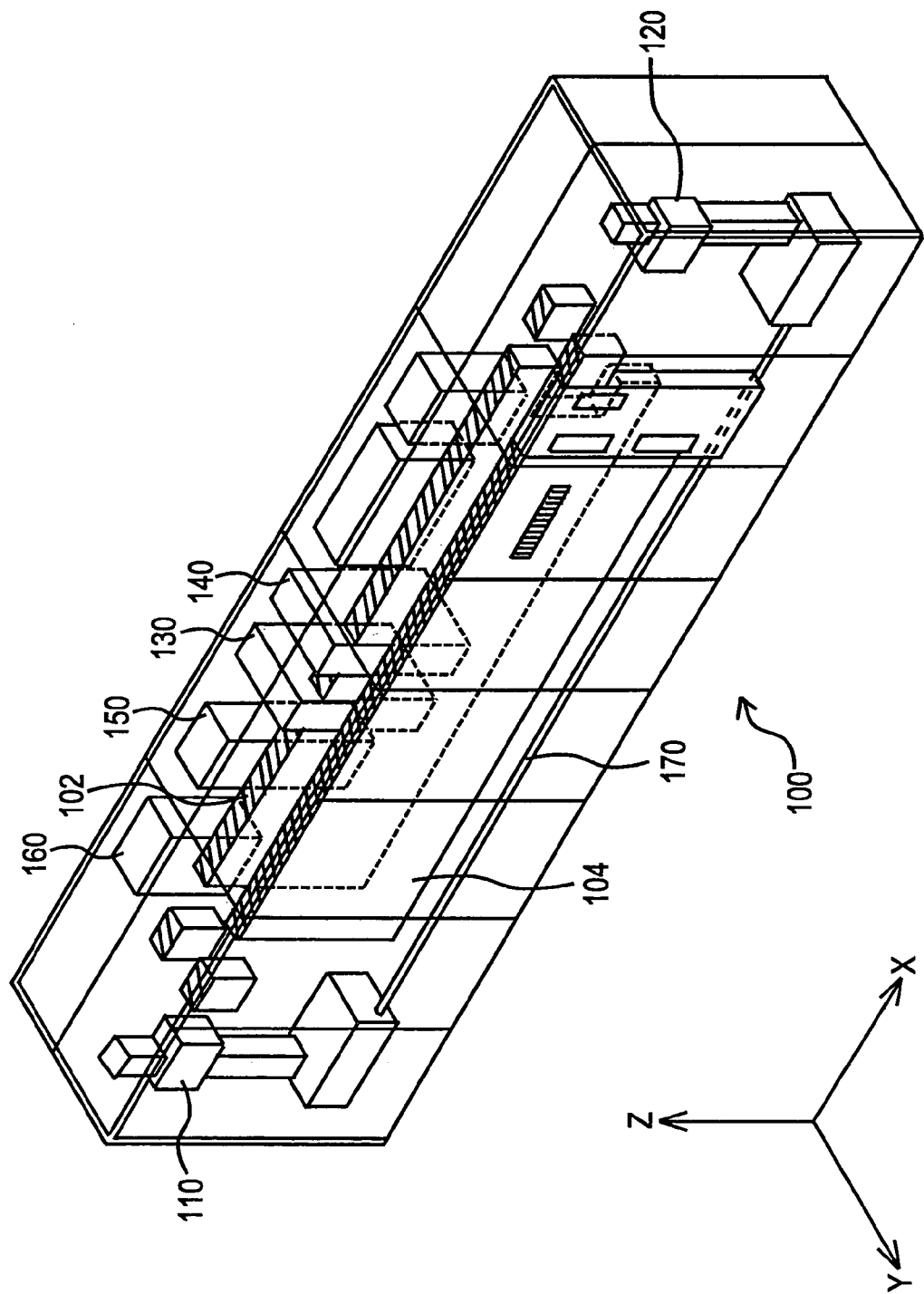
FIG. 1 is a perspective view of Applicants' automated data storage system.

Referring to FIG. 1, automated data storage and retrieval system 100 is shown having a first wall of storage slots 102 and a second wall of storage slots 104. Information storage media are individually stored in these storage slots. The information storage media are housed within a portable container, i.e. a cartridge. Examples of such information storage media include magnetic tapes, magnetic disks, optical disks of various types, including ROM, WORM, rewriteable, and the like.

Applicants' invention comprises an automated data storage and retrieval system which includes one or more accessors, such as accessors 110 and 120. An accessor is a robotic device which accesses, among other things, information storage media from storage slots 102 or 104, delivers that accessed media to information storage devices 130/140 for reading and/or writing data thereon, and returns the media to the proper storage slot. As shown in FIG. 1, accessors 110 and 120 travel bi-directionally along rail 170 in an aisle disposed between first wall of storage slots 102 and second wall of storage slots 104. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

In certain embodiments, device 160 comprises a library controller. In certain of these embodiments, library controller 160 is integral with a computer. In other embodiments, Applicants' data storage and retrieval system utilizes a distributed control network. In these distributed control network embodiments, device 160 comprises a motion card pack. Operator input station 150 permits an operator to communicate with automated data storage and retrieval system 100.

Referring to FIG. 2, accessor 110 travels bi-directionally along rail system 170. In the embodiment shown in FIG. 2, rail system 170 comprises one or more rails. Accessor 110 includes vertical pillar 210. Lifting servo section 218 moves vertically along pillar 210. In the two gripper embodiment shown in FIG. 2, accessor 110 includes first gripper 212 and second gripper 214. As discussed above, in other embodiments of Applicants' invention the accessors include a single gripper.

In the illustrated embodiment of FIG. 2, accessor 110 rotates such that one gripper can access a data storage medium from, for example, first wall of storage slots 102 (FIG. 1), and then rotate to deliver that accessed medium to information storage device 130 or 140 (FIG. 1). Therefore, accessor 110 includes a first gripper motor to actuate the gripping action of first gripper 212, a second gripper motor to actuate the gripping action of second gripper 214, and a pivot motor to effectuate rotation.

Figure 3:
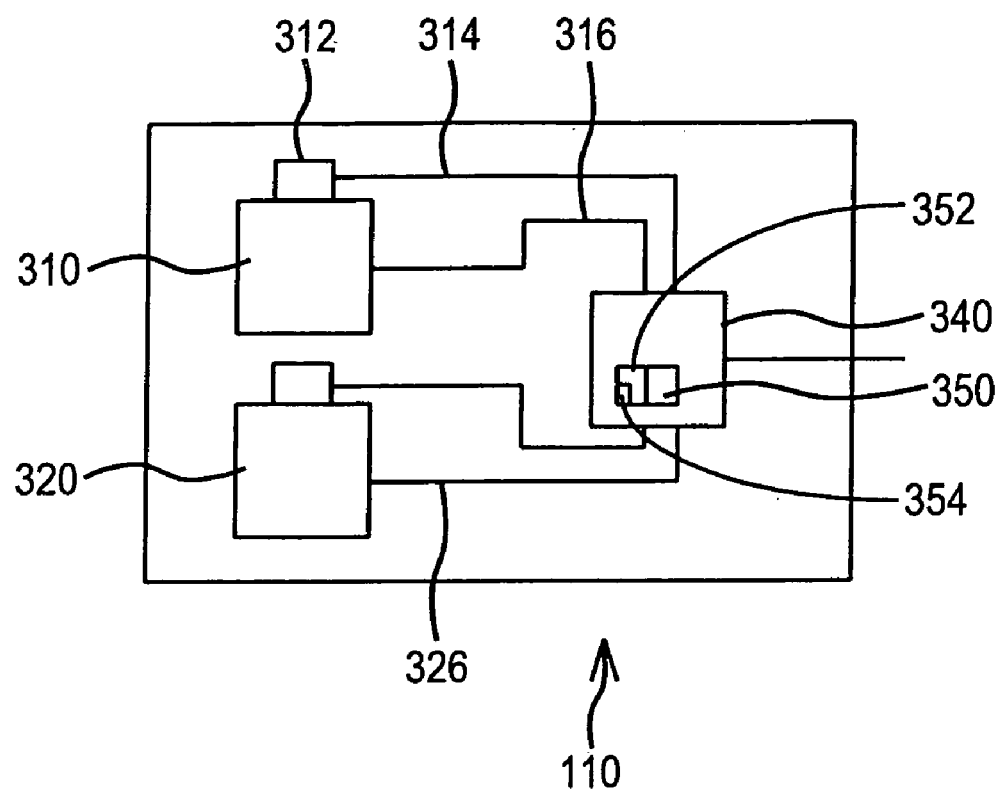
FIG. 3 is a block diagram showing motorized components disposed on Applicants' accessor.

In the embodiment shown in the block diagram of FIG. 3, accessor 110 includes carriage motor 310 and gripper motor 320. Carriage motor 310 moves accessor 110 bidirectionally along rail 170 (FIGS. 1, 2). Gripper 320 motor actuates the gripping function of a gripper disposed on the accessor, such as gripper 212 (FIG. 2). Controller 340 includes velocity control program 350. Velocity control program 350 controls the operation of carriage motor 310. Velocity control program 350 generates, and controller 340 provides, operational commands to carriage motor 310 via communication link 316.

Figure 11:
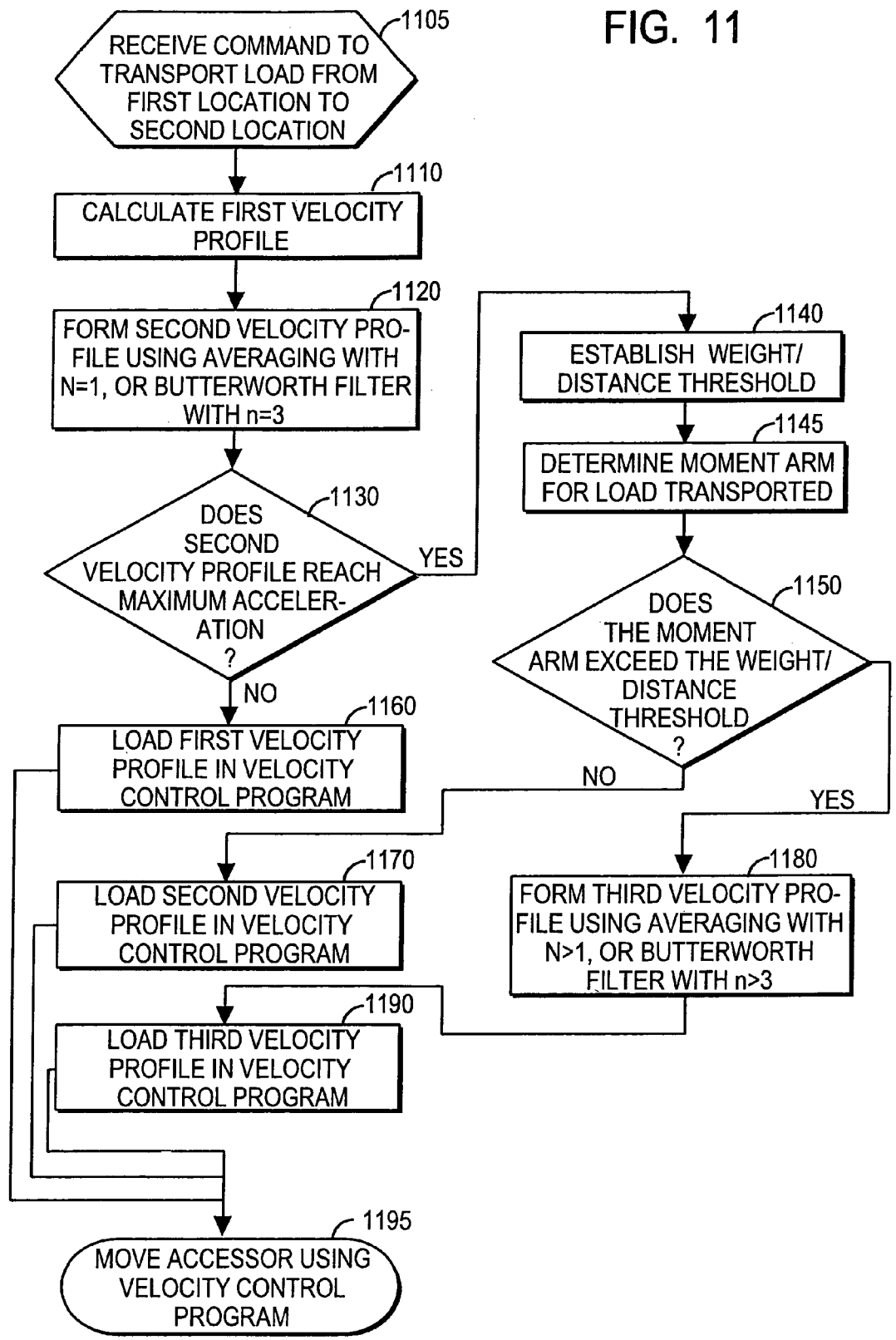
FIG. 11 is a flow chart summarizing the steps of Applicants' method to control the movement of Applicants' accessor.

Applicants' invention includes a method to form one, two, and/or three velocity profiles to move an accessor carrying a designated object from a first location to a second location, over a transit distance Dx comprising a distance D along the X axis of FIGS. 1 and 2, within a data storage and retrieval system, such as data storage and retrieval system 100 (FIG. 1). FIG. 11 summarizes the steps of Applicants' method.

Referring now to FIG. 11, in step 1105 an accessor, such as accessor 110 (FIG. 1) receives a command to retrieve and transport a load from a first location to a second location. In certain embodiments, the command of step 1105 may include retrieving a designated object from, for example, a storage slot disposed in first storage wall 102 (FIG. 1), and travel distance Dx while maintaining that load a distance Dz above carriage portion 220 (FIG. 2), where distance Dz lies along the Z axis of FIGS. 1 and 2. For example and referring again to FIG. 2, lifting servo section 218 is shown positioned a distance 230 from carriage 220. In the event accessor 220 transports an object using lifting servo section 218 (FIG. 2) in the position shown in FIG. 2, then Dz would equal distance 230. In certain embodiments, the designated object may comprise relatively low mass, such as a portable tape cartridge. In other embodiments, the designated object may comprise greater mass, such as a hard disk drive unit or a portable fan module.

As those skilled in the art will appreciate, it is advantageous to minimize the time required to transport the designated object from its storage slot to the destination location. In step 1110, Applicants' method calculates a first velocity profile, where that first velocity profile uses the accessor's maximum acceleration $a_{MAX}$ to attain the accessor's maximum velocity $V_{MAX}$ in the shortest period of time, and then cause the accessor to travel at $V_{MAX}$ for the greatest period of time.

Figure 4:
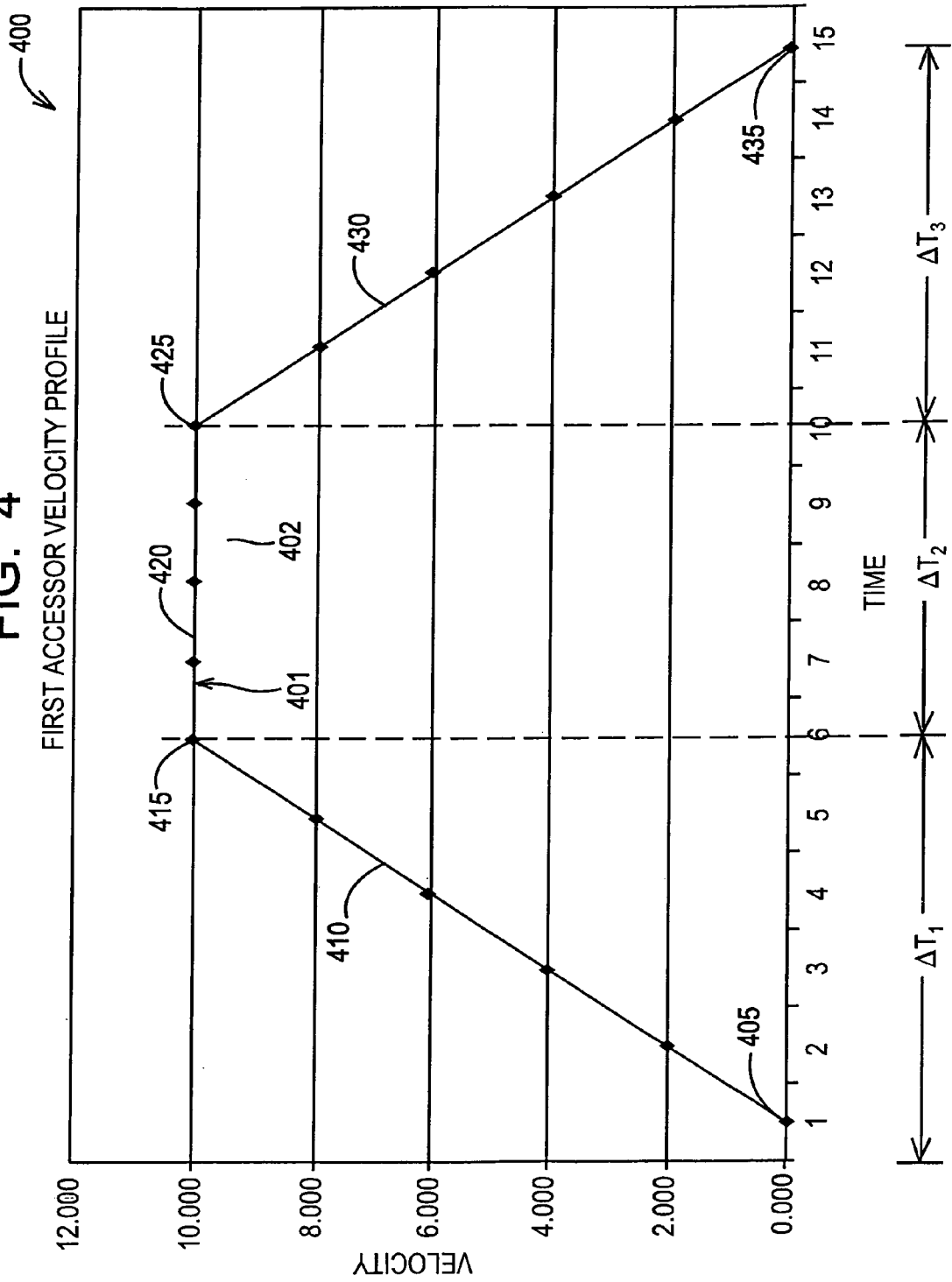
FIG. 4 is graph showing Applicants' first velocity profile.

FIG. 4 graphically depicts such a first velocity profile Referring to FIG. 4, curve portion 410 comprises a first segment of that first velocity profile wherein the accessor accelerates at $a_{MAX}$ to reach its maximum velocity $V_{MAX}$. At point 415, the accessor reaches that maximum velocity. As those skilled in the art will appreciate, the distance $s_{(1)}$ traveled by the accessor in this first segment can be calculated using the formula:

$$s_{(1)} = (\tfrac{1}{2})(a_{MAX})\Delta T_1^2$$

Curve portion 420 comprises a second segment of the first velocity profile wherein the accessor continues to travel at $V_{MAX}$. As those skilled in the art will appreciate, the distance $s_{(2)}$ traveled by the accessor in this second segment can be calculated by the formula:

$$s_{(2)} = (V_{max})\Delta T_2$$

Curve portion 430 comprises a third segment of the first velocity profile wherein the accessor decelerates at $-a_{MAX}$ from a velocity of $V_{MAX}$ at point 425 to velocity of 0 at point 435. Because the accessor's maximum acceleration equals the accessor's maximum deceleration, curve portion 430 is the mirror image of curve portion 410. Therefore, the distance $s_{(3)}$ traveled by the accessor during the third segment equals the distance traveled by the accessor during the first segment $s_{(1)}$.

In the event the transit distance D is less than $s_{(1)(MAX)} + s_{(3)(MAX)}$, then the accessor never reaches $V_{MAX}$ before decelerating to arrive at the destination. As those skilled in the art will appreciate, with such a short transit distance there is no constant-velocity segment in the first velocity profile, and the first and thirds segments are abbreviated with respect to curves 410 and 430.

Where $D \geq s_{(1)(MAX)} + s_{(3)(MAX)}$, however, then the accessor will reach $V_{MAX}$ using the first velocity profile. Table I recites such a first velocity profile using such a maximum acceleration and such a maximum velocity. Table I comprises an array of velocity/time datapoints used to move the accessor from a first location to a second location in the shortest period of time. In the embodiment of TABLE I, $V_{MAX}$ is 10.0, and $a_{MAX}$ is 2.0. As those skilled in the art will appreciate, the distance traveled for any of time/velocity datapoints can be determined using the formula $s = v_0 t + (\tfrac{1}{2})at^2$, where s equals the distance, $v_0$ is the initial velocity, a is the acceleration, and t is the time.

TABLE I

| Time | Velocity |
| --- | --- |
| 0 | 0.000 |
| 1 | 2.000 |
| 2 | 4.000 |
| 3 | 6.000 |
| 4 | 8.000 |
| 5 | 10.000 |
| 6 | 10.000 |
| 7 | 10.000 |
| 8 | 10.000 |
| 9 | 10.000 |
| 10 | 8.000 |
| 11 | 6.000 |
| 12 | 4.000 |
| 13 | 2.000 |
| 14 | 0.000 |

FIG. 4 comprises graph 400 which graphically depicts velocity profile 401 comprising the datapoints of table I. As those skilled in the art will appreciate, graph 400 recites units on the X axis for time and units on the Y axis for velocity, i.e. (distance/time). As those skilled in the art will further appreciate, units for time could comprise, for example, milliseconds, and the units for velocity could comprise, for example, meters per second.

In certain embodiments, accessor 110 (FIGS. 1, 2, 3) includes digital tachometer 312 (FIG. 3) coupled to carriage motor 310 (FIG. 3). Digital tachometer communicates with controller 340 (FIG. 3) using communication link 314 (FIG. 3). As the accessor moves in the +X or −X direction, the digital tachometer records that movement. Thus, a "Tach" comprises a known distance. In these embodiments, the units for velocity could comprise Tachs/second.

Figure 5:
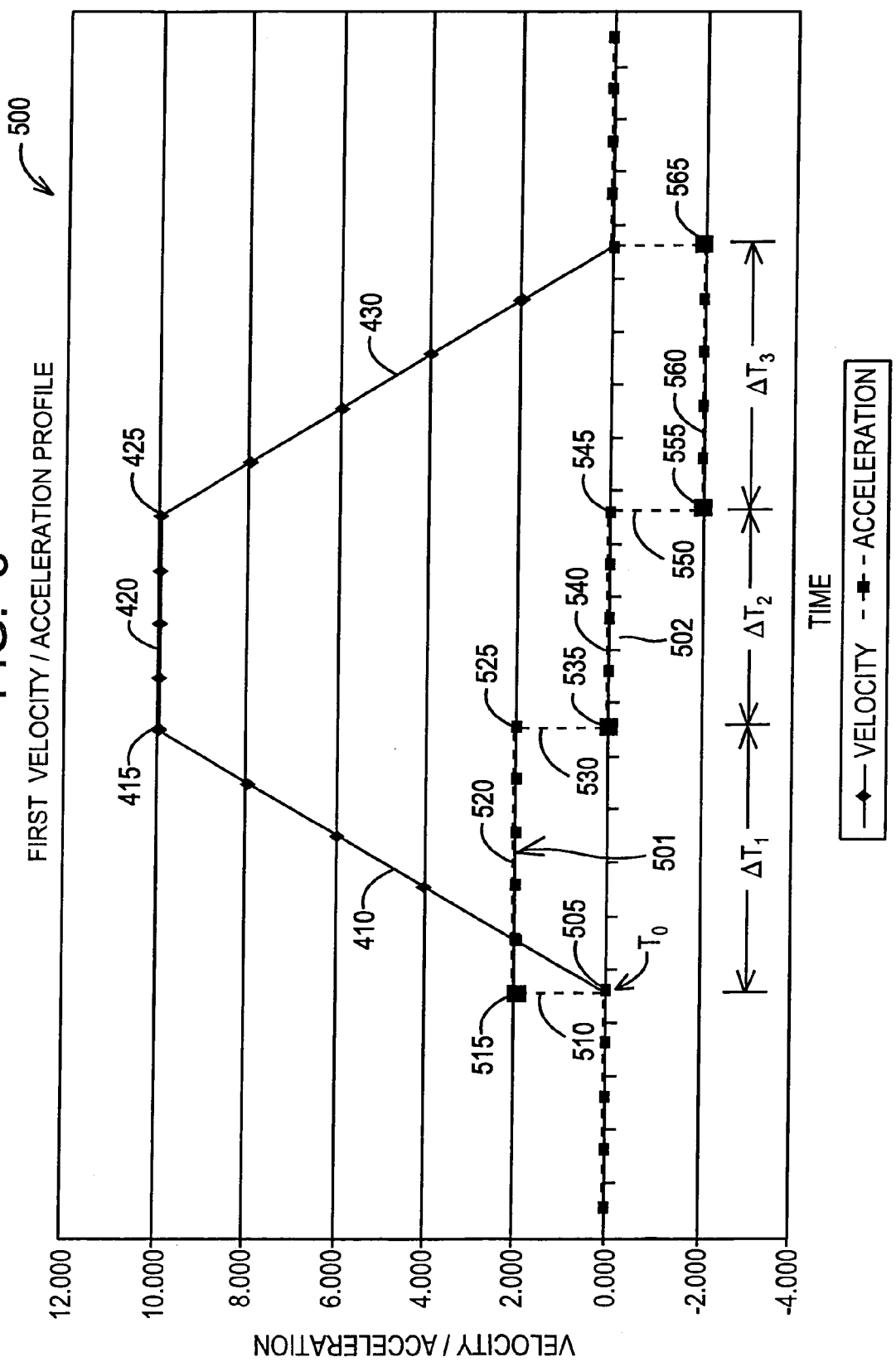
FIG. 5 is a graph showing Applicants' first velocity profile and the corresponding acceleration profile.

FIG. 5 comprises graph 500 which graphically depicts the first velocity profile 401 of graph 400 and the corresponding acceleration profile 501. As those skilled in the art will appreciate, graph 500 recites units for time on the X axis, and units for velocity (distance/time) and acceleration (distance/time$^2$) on the Y axis. As those skilled in the art will further appreciate, units for time could comprise, for example, seconds, the units for velocity could comprise, for example, meters per second, and the units for acceleration could comprises, for example, meters/second$^2$. Alternatively, the units for acceleration could comprise Tachs/second$^2$.

Referring to FIGS. 4 and 5, the accessor is located at the first location at time $T_0$. At time $T_1$ on FIG. 4, the accessor is moved from the first location toward the second location, at an acceleration of 2.0. Curve portion 410 shows the velocity profile for the accessor during time interval $\Delta T_1$. Curve portions 510, 520, and 530, show the accessor's acceleration during time interval $\Delta T_1$. As curve 410 shows, the accessor accelerates from standing still, i.e. velocity=0, represented by point 405, and reaches the maximum velocity of 10.0 at point 415.

Curve portion 420 shows movement of the accessor at $V_{MAX}$ throughout time interval $\Delta T_2$. When the accessor reaches $V_{MAX}$ at point 415, curve 530 shows the acceleration decreasing to zero. From point 535 to point 545, the acceleration is zero and the accessor moves at $V_{MAX}$.

Curve portion 430 shows the accessor's velocity decreasing from $V_{MAX}$ throughout time interval $\Delta T_3$ as it approaches the destination location. At point 425 the velocity begins to slow from $V_{MAX}$. At point 435 the accessor arrives at its destination, and its velocity is 0. Curve portions 550 and 560 show the deceleration of the accessor throughout time interval $\Delta T_3$. At point 545, the accessor's acceleration changes from 0 to $-a_{MAX}$ and maintains that maximum rate of deceleration until point 565.

As described above, the velocity profile of FIGS. 4 and 5, and the acceleration profile of FIG. 5, represent moving the accessor from a first location to a second location at the fastest overall time, i.e. at maximal use of both $V_{MAX}$ and $a_{MAX}$, i.e. a trapezoidal velocity profile. At points 405, 415, 425, and 435, however, the velocity profile of FIG. 4 requires abrupt changes in the acceleration of the accessor. These abrupt acceleration changes can induce undesirable accessor vibrations and/or oscillations, particularly along vertical pillar 210 (FIG. 2).

Figure 13:
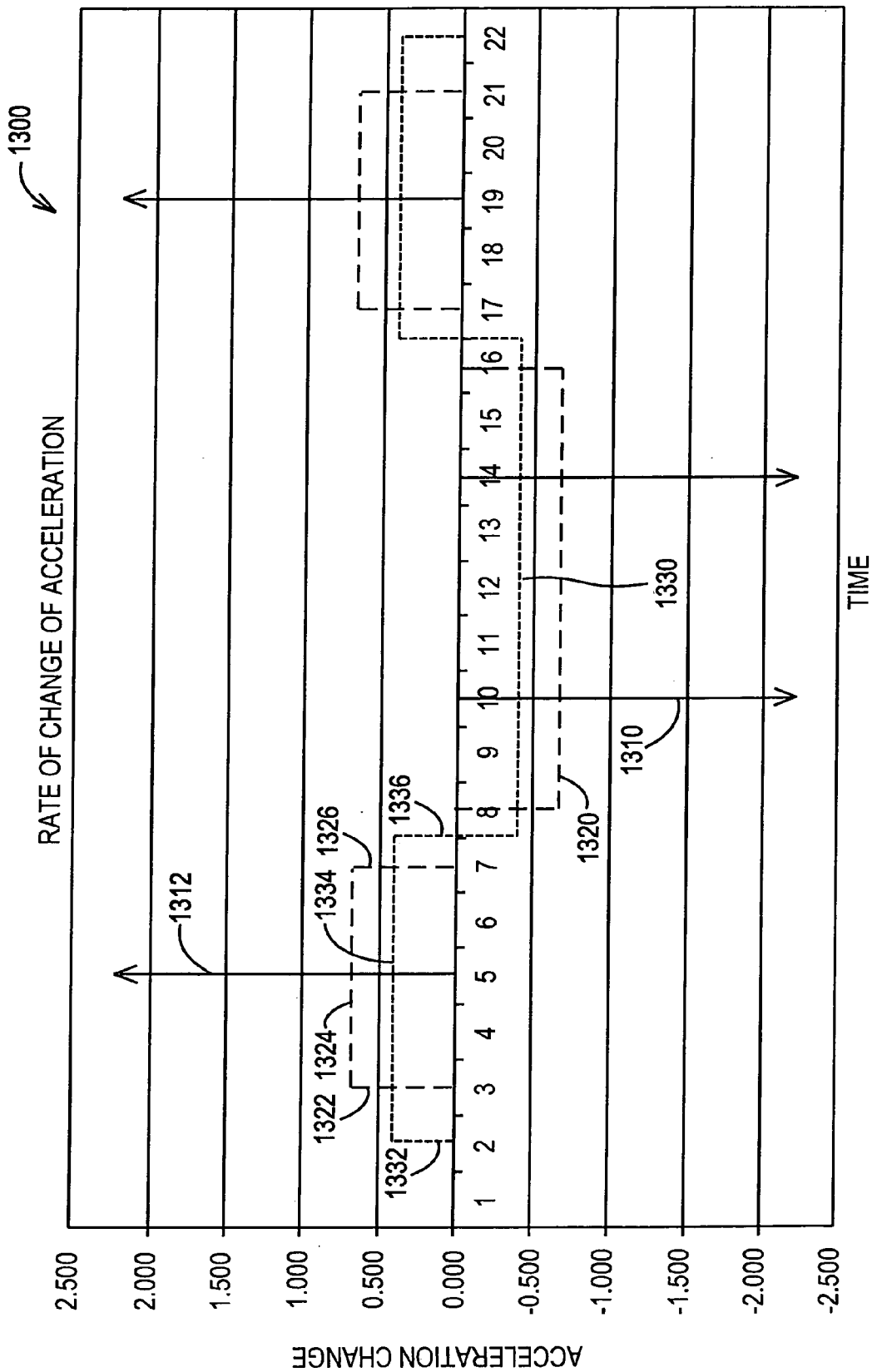
FIG. 13 is a graph showing the changes in acceleration, i.e. the jerk, using Applicants' first velocity profile, one embodiment of Applicants' second velocity profile, and one embodiment of Applicants' third velocity profile.

Moving an accessor using Applicants' first velocity profile requires a first rate of change of acceleration. Referring to FIG. 13, curve 1310 comprising a solid line shows that first rate of change of the accessor's acceleration using Applicants' first velocity profile. As those skilled in the art will appreciate, the rate of change of acceleration is sometimes referred to as "jerk." As FIG. 5 shows, using Applicants' first velocity profile the acceleration instantaneously changes from 0 to $a_{MAX}$ at time $t_0$. Such an instantaneous change in acceleration gives rise to a jerk approaching infinity shown in curve portion 1312 as a spike value at time $t_5$.

Figure 12A:
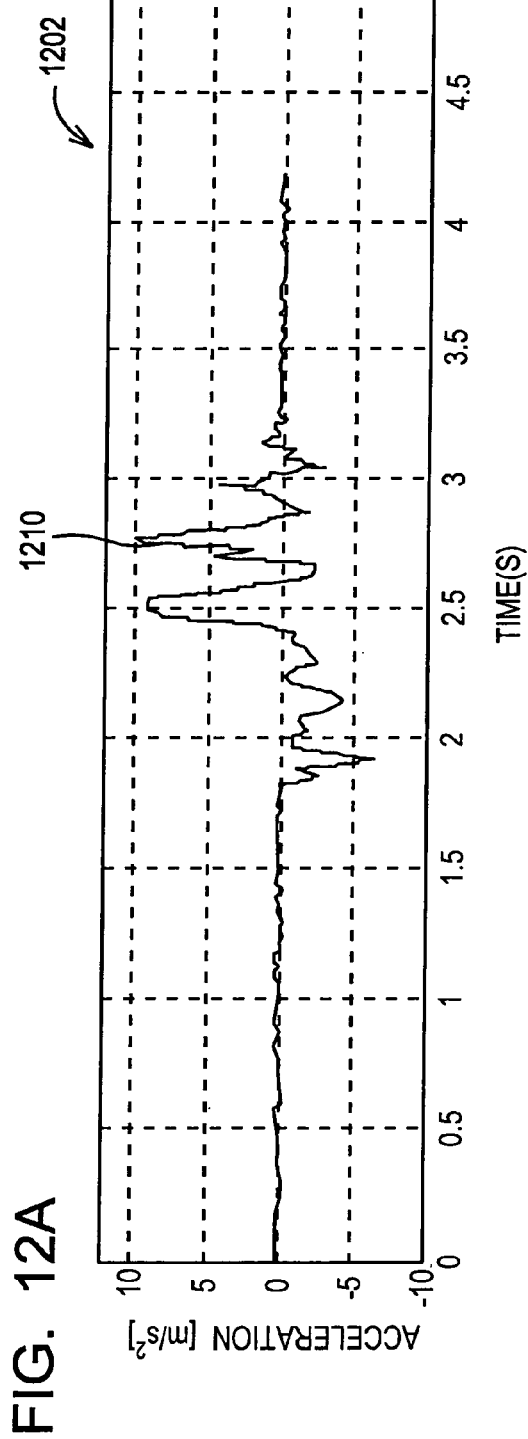
FIG. 12A is a graph showing the measured acceleration of Applicants' accessor as a function of time when moving that accessor using Applicants' first velocity profile.

Referring now to FIG. 12A, graph 1202, comprising curve 1210, recites the measured acceleration of an accessor as a function of time, where that accessor is moved at a $V_{MAX}$ of 2000 Tachs/second using Applicants' first velocity profile. As curve 1201 shows, the measured acceleration varies from about −6 m/sec$^2$ to about 11 m/sec$^2$.

To minimize/eliminate undesirable accessor vibrations/oscillations which may result from using the Applicants' first velocity profile while maintaining an acceptable overall transport rate, Applicants' method calculates one or more "smoothed" velocity profiles. Such a smoothed velocity profile requires less abrupt acceleration changes thereby generating fewer accessor vibrations/oscillations. As described below, the degree of "smoothing" applied to the first velocity profile varies according to a number of factors. In step 1120, Applicants' method forms a second velocity profile, i.e. a "smoothed" profile, comprising, for example, an averaged profile or a filtered profile.

TABLE II recites time and velocity datapoints for the first velocity profile, described above, in the column designated "N=0", and a second velocity profile in the column designated "N=1". The datapoints recited in the column designated "N=0" corresponds to the datapoints of TABLE I discussed above. Where N=0, no averaging of datapoints is used.

TABLE II

| Time | N = 0 | N = 1 |
| --- | --- | --- |
| 0 | 0.000 | 0.000 |
| 1 | 0.000 | 0.000 |
| 2 | 0.000 | 0.000 |
| 3 | 0.000 | 0.000 |
| 4 | 0.000 | 0.667 |
| 5 | 2.000 | 2.000 |
| 6 | 4.000 | 4.000 |
| 7 | 6.000 | 6.000 |
| 8 | 8.000 | 8.000 |
| 9 | 10.000 | 9.333 |
| 10 | 10.000 | 10.000 |
| 11 | 10.000 | 10.000 |
| 12 | 10.000 | 10.000 |
| 13 | 10.000 | 9.333 |

TABLE II-continued

| Time | N = 0 | N = 1 |
|------|-------|-------|
| 14 | 8.000 | 8.000 |
| 15 | 6.000 | 6.000 |
| 16 | 4.000 | 4.000 |
| 17 | 2.000 | 2.000 |
| 18 | 0.000 | 0.667 |
| 19 | 0.000 | 0.000 |
| 20 | 0.000 | 0.000 |
| 21 | 0.000 | 0.000 |
| 22 | 0.000 | 0.000 |

In the embodiment of TABLE II, the velocity datapoints for the array designated N=1 each comprise an average of three datapoints from TABLE I, using equation (1):

$$V_{(i)avg} = (1/(2N+1))(V_{(i-N)} + V_{(i-(N-1))} \cdots + V_{(i)} \cdots + V_{(i+(N-1))} + V_{(i+(N))}) \quad (1)$$

where n=1. Thus, the calculated datapoint $V_{(4)avg}$, corresponding to the velocity datapoint for $T_4$ where N=1, is calculated by averaging velocity datapoints $V_{(3)}$, $V_{(4)}$, and $V_{(5)}$. The value for "N", therefore, defines the span of the averaging window. Thus, for N=1, the $V_{(i)avg}$ datapoint is calculated by averaging the $V_{(i)}$ datapoint and one "neighboring" datapoint on either side, i.e. the $V_{(i-1)}$ datapoint and the $V_{(i+1)}$ datapoint. Thus in the embodiment of TABLE II, datapoint $V_{(i)avg} = (\frac{1}{3})(V_{(i-1)} + V_{(i)} + V_{(i+1)})$. For example, velocity datapoint $V_{(4)avg}$ is calculated by averaging 0.000 and 0.000 and 2.000 to give a value of 0.667.

Figure 6:
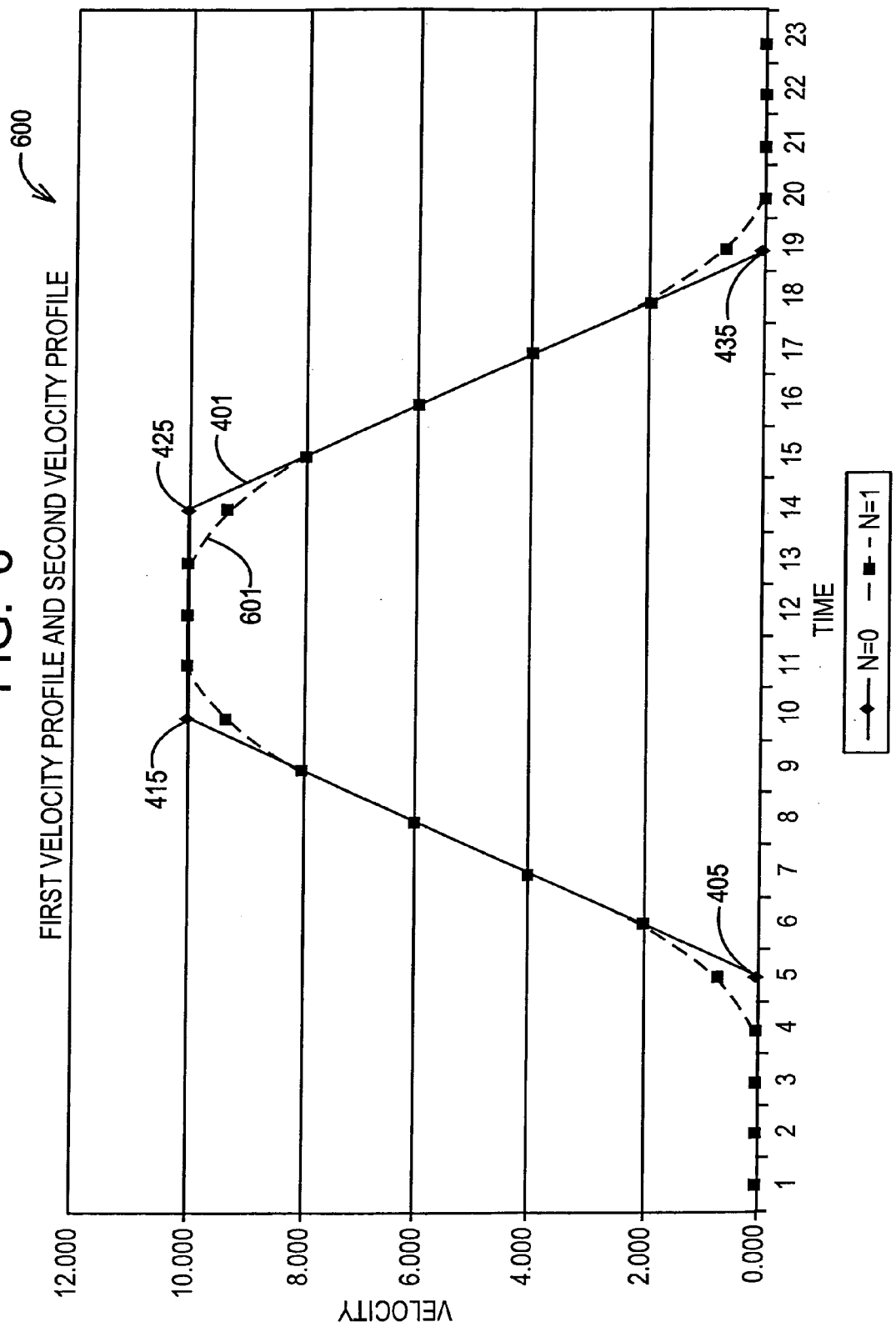
FIG. 6 is a graph showing Applicants' first velocity profile and a first embodiment of Applicants' second velocity profile.

The calculated velocity datapoints recited in TABLE II for N=1 comprise one embodiment of Applicants' second velocity profile of step 1120. FIG. 6 comprises graph 600 which shows, inter alia, curve 401 which graphically depicts the first velocity profile of TABLE I, and curve 601 which graphically depicts the embodiment of the second velocity profile of TABLE II. As curve 601 shows, the abrupt velocity change points 405, 415, 425, and 435, of the first velocity profile have been smoothed in the second velocity profile. Moving an accessor from a first location to a second location within Applicants' data storage and retrieval system using Applicants' second velocity profile results in fewer accessor vibrations/oscillations during that move operation.

Referring again to FIG. 13, curve 1320 comprising a dashed line shows the rate of change of acceleration, i.e. the jerk, using Applicants' second velocity profile of FIG. 6. The maximum jerk using Applicants' second velocity profile is about 0.667 and −0.667 using the second velocity profile of Table II. Therefore, moving an accessor using Applicants' second velocity profile requires a second maximum rate of acceleration change, where that second maximum rate of acceleration change is less than the first maximum rate of acceleration change required if using Applicants' first velocity profile.

In another embodiment, the second velocity profile of step 1160 is calculated using a "moving average filter" calculation. In this embodiment, each calculated, i.e. "filtered", datapoint is found by taking the average of several of the unfiltered data points, using equation (2):

$$V_{(i)avg} = (1/(2N+1))(V_{(i-2N)} + V_{(i-(2N-1))} + V_{(i-(2N-2))} \cdots + V_{(i)}) \quad (2)$$

TABLE III recites in the column designated "N=0" the velocity datapoints comprising Applicants' first velocity profile discussed above. TABLE III further recites in the column designated "N=1" the calculated datapoints comprising Applicants' second velocity profile where each of those datapoints are calculated using equation (2) with N=1, and the datapoints of TABLE I.

TABLE III

| Time | N = 0 | N = 1 |
|------|-------|-------|
| 0 | 0.000 | 0.000 |
| 1 | 0.000 | 0.000 |
| 2 | 0.000 | 0.000 |
| 3 | 0.000 | 0.000 |
| 4 | 0.000 | 0.000 |
| 5 | 2.000 | 0.667 |
| 6 | 4.000 | 2.000 |
| 7 | 6.000 | 4.000 |
| 8 | 8.000 | 6.000 |
| 9 | 10.000 | 8.000 |
| 10 | 10.000 | 9.333 |
| 11 | 10.000 | 10.000 |
| 12 | 10.000 | 10.000 |
| 13 | 10.000 | 10.000 |
| 14 | 8.000 | 9.333 |
| 15 | 6.000 | 8.000 |
| 16 | 4.000 | 6.000 |
| 17 | 2.000 | 4.000 |
| 18 | 0.000 | 2.000 |
| 19 | 0.000 | 0.667 |
| 20 | 0.000 | 0.000 |
| 21 | 0.000 | 0.000 |
| 22 | 0.000 | 0.000 |

Figure 9:
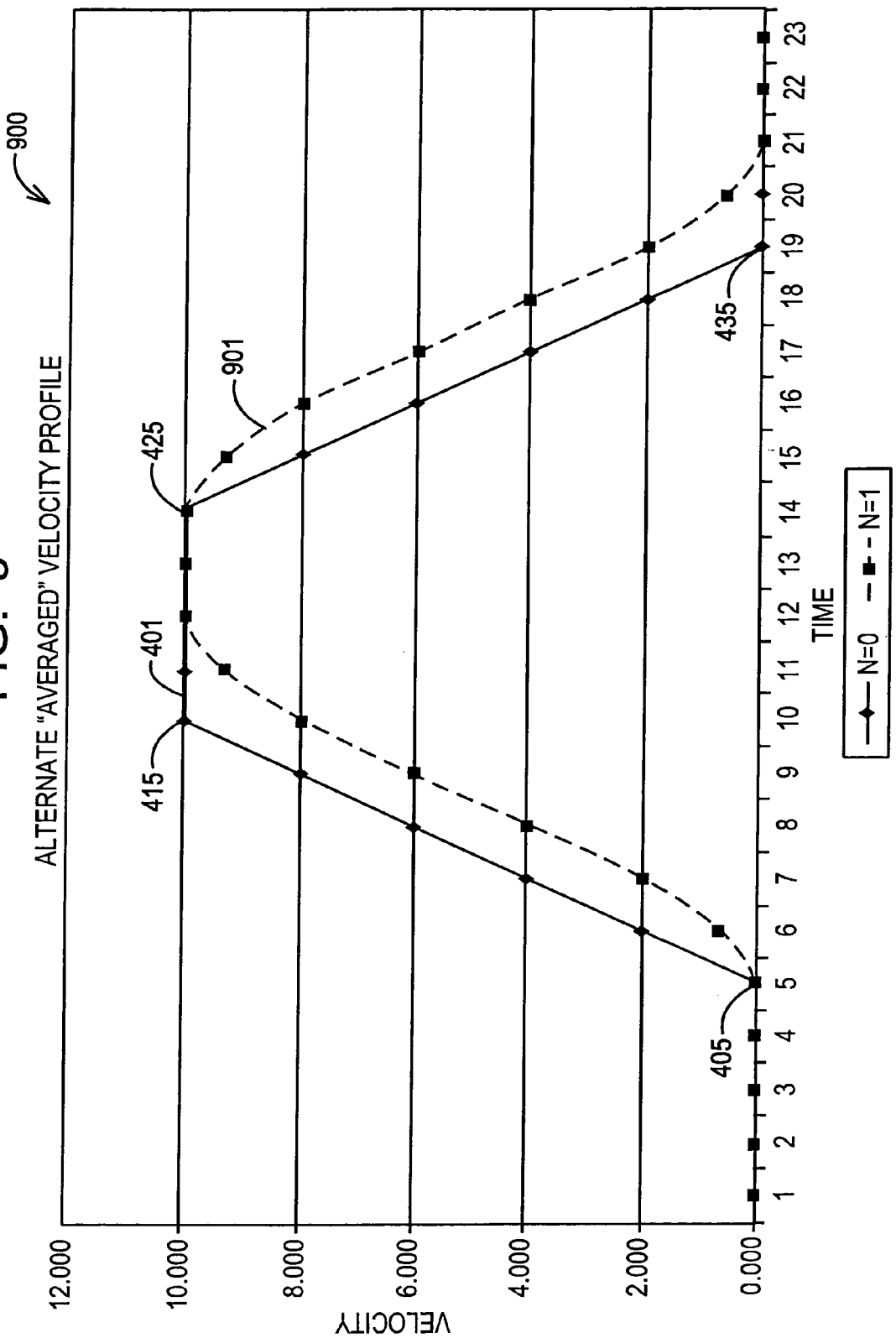
FIG. 9 is a graph showing a second embodiment of Applicants' second velocity profile.

FIG. 9 comprises graph 900 which recites curve 401 which represents Applicants' first velocity profile, and curve 901 which represents a second embodiment of Applicants' second velocity profile comprising the datapoints of TABLE III where N=1. Graph 900 shows that the embodiment of Applicants' second velocity profile, formed using equation (2) with N=1, avoids the abrupt acceleration change points of Applicants' first velocity profile. In certain embodiments, step 1120 includes using equation (2) where N=1.

Figure 10:
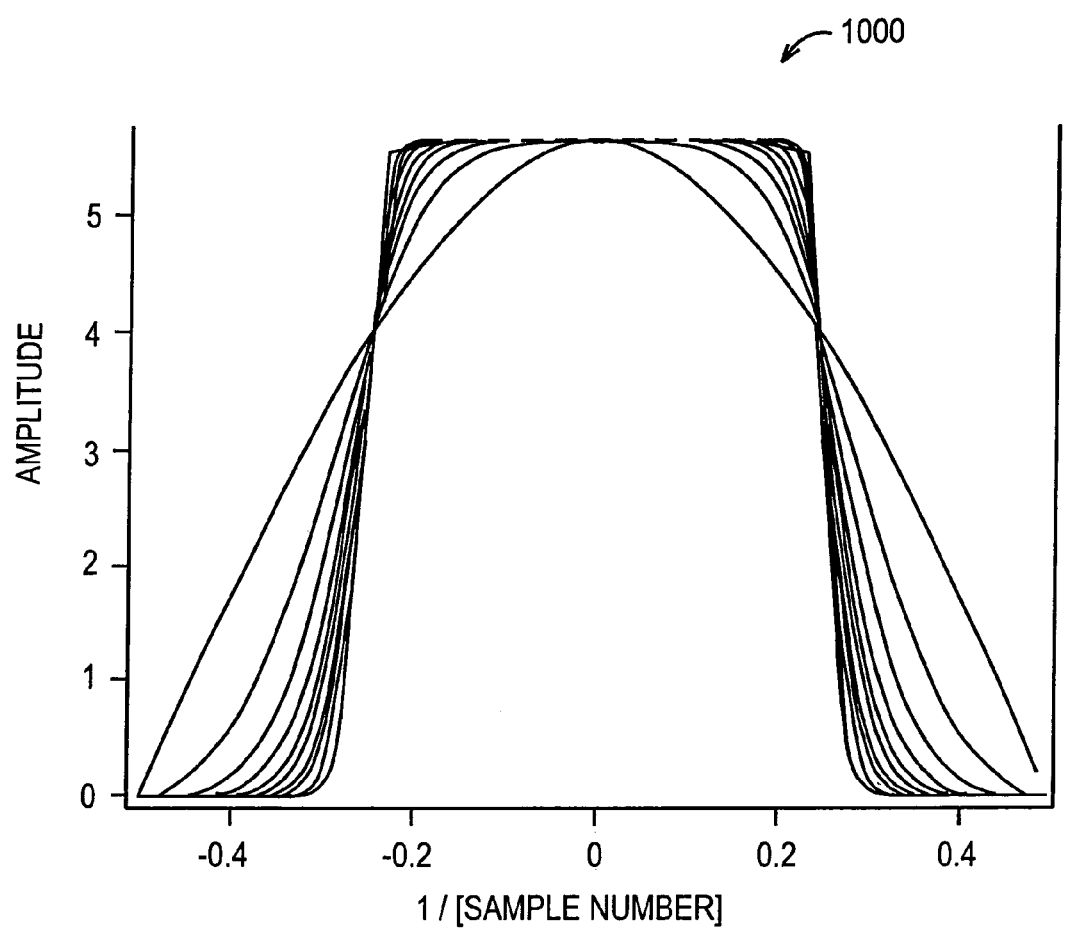
FIG. 10 is a graph showing the results of passing a square wave function through a low pass, nth order Butterworth filter.

In another embodiment of Applicant's method, step 1120 includes calculating a first acceleration profile, such as acceleration profile 501 (FIG. 5), passing that first acceleration profile through a Butterworth filter to remove the instantaneous changes in acceleration, and integrating that smoothed acceleration profile to form the second velocity profile. FIG. 10 graphically depicts values $|B(\omega)|$ for a square wave passed through a Butterworth filter for various values of $\omega_o$. In certain embodiments, step 1120 includes passing Applicants' first acceleration profile through a third order low-pass Butterworth filter with a cutoff frequency of about 15 Hertz. Integrating the result forms a "filtered" velocity profile nearly identical to the second velocity profile of TABLE III. In certain embodiments, step 1120 includes using a low pass Butterworth filter to "smooth" Applicants' first velocity profile, where that Butterworth filter has a cutoff frequency greater than about 15 hertz.

Figure 12B:
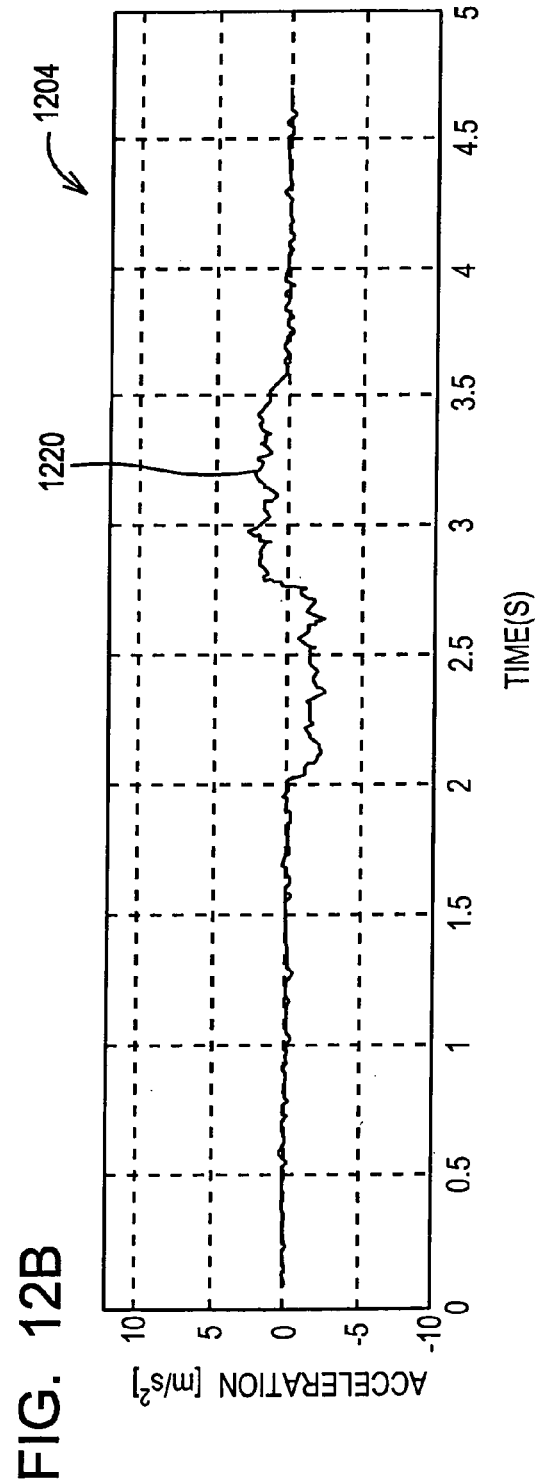
FIG. 12B is a graph showing the measured acceleration of Applicants' accessor as a function of time when moving that accessor using one embodiment of Applicants' second velocity profile.

Referring now to FIG. 12B, graph 1204 comprises curve 1220 which recites the measured acceleration of an accessor as a function of time, where that accessor is moved at a $V_{MAX}$ of 2000 Tachs/second using Applicants' second velocity profile. As curve 1220 shows, the measured acceleration varies from about −2.5 m/sec² to about +2.5 m/sec². Comparing FIGS. 12A and 12B, the accessor was moved at an identical $V_{MAX}$ using Applicants' first velocity profile (curve 1210) and using Applicants' second velocity profile (curve 1220). Curve 1220 clearly shows decreased measured accelerations, both positive and negative, in comparison to curve 1210. The comparisons of curves 1210 and 1220 clearly shows that use of Applicants' second velocity profile imposes smaller acceleration changes on the accessor while using the identical $V_{MAX}$. Those skilled in the art will readily appreciate, that the decreased measured accelerations of curve 1220 result in fewer accessor vibrations and/or oscillations. Those skilled in the art will further readily appreciate, that the reduction in measured accelerations seen in curve 1220 in comparison with curve 1210 result in increased accessor reliability, increased mean times between failures for the accessor, and reduced maintenance costs.

Referring again to FIG. 11, in step 1130 Applicants' method determines if the second velocity profile of step 1120 includes using the accessor's maximum rate of acceleration. If Applicants' method determines in step 1130 that the second velocity profile does not require use of the accessor's maximum acceleration, then Applicants' method transitions from step 1130 to step 1160 wherein Applicants' method loads the first velocity profile of step 1110 into the accessor's velocity control program. Thereafter, Applicants' method transitions from step 1160 to step 1195 wherein Applicants' method moves the accessor using the velocity control program.

Alternatively, if Applicants' method determines in step 1130 that the second velocity profile includes using the accessor's maximum acceleration, then Applicants' method transitions from step 1130 to step 1140 wherein Applicants' method establishes a threshold moment arm for the designated accessor, where that threshold moment arm has units of distance—force. Depending on individual accessor design parameters and operational characteristics, certain accessors can withstand more abrupt acceleration changes without experiencing deleterious oscillations and/or vibrations.

In step 1145, Applicants' method calculates the actual moment arm for the load being transported. For example, if the accessor accelerates at 1 meter per second$^2$ while transporting a tape cartridge having a mass of 0.5 kilograms carried 1 meter above the carriage, then in step 1145 Applicants' method calculates an actual moment arm of 0.5 Newton-meters. On the other hand, if the accessor accelerates at 10 meters per second$^2$ while transporting a hard disk drive unit having a mass of 5 kilograms 3 meters above the carriage, then in step 1145 Applicants' method calculates an actual moment arm of 150 Newton-meters.

Referring again to FIG. 11, if Applicants' method determines in step 1150 that the actual moment arm does not exceed the threshold moment arm, then Applicants' method transitions from step 1150 to step 1170 wherein Applicants' method loads the second velocity profile of step 1120 into the accessor's velocity control program. Applicants' method transitions from step 1170 to step 1195 wherein Applicants' method moves the accessor using the velocity control program.

Alternatively, if Applicants' method determines in step 1150 that the actual moment arm does exceed the threshold moment arm, then Applicants' method transitions from step 1150 to step 1180 wherein Applicants' method calculates a third velocity profile, where that third velocity profile comprises more "smoothing" than does the second velocity profile of step 1120.

TABLE IV recites time and velocity datapoints for the first velocity profile of TABLE I in the column designated "N=0", the second velocity profile of TABLE II in the column designated "N=1", and Applicants' third velocity profile in the column designated "N=2".

TABLE IV

| Time | N = 0 | N = 1 | N = 2 |
| --- | --- | --- | --- |
| 0 | 0.000 | 0.000 | 0.000 |
| 1 | 0.000 | 0.000 | 0.000 |
| 2 | 0.000 | 0.000 | 0.000 |
| 3 | 0.000 | 0.000 | 0.400 |
| 4 | 0.000 | 0.667 | 1.200 |
| 5 | 2.000 | 2.000 | 2.400 |
| 6 | 4.000 | 4.000 | 4.000 |
| 7 | 6.000 | 6.000 | 6.000 |
| 8 | 8.000 | 8.000 | 7.600 |
| 9 | 10.000 | 9.333 | 8.800 |
| 10 | 10.000 | 10.000 | 9.600 |
| 11 | 10.000 | 10.000 | 10.000 |
| 12 | 10.000 | 10.000 | 9.600 |
| 13 | 10.000 | 9.333 | 8.800 |
| 14 | 8.000 | 8.000 | 7.600 |
| 15 | 6.000 | 6.000 | 6.000 |
| 16 | 4.000 | 4.000 | 4.000 |
| 17 | 2.000 | 2.000 | 2.400 |
| 18 | 0.000 | 0.667 | 1.200 |
| 19 | 0.000 | 0.000 | 0.400 |
| 20 | 0.000 | 0.000 | 0.000 |
| 21 | 0.000 | 0.000 | 0.000 |
| 22 | 0.000 | 0.000 | 0.000 |

In the embodiment of TABLE IV, the velocity datapoints comprising one embodiment of Applicants' third velocity profile each comprise an average of five datapoints from TABLE I using equation (1) with N=2. Thus, using equation (1) with N=2, the $V_{(i)avg}$ datapoint is calculated by averaging the $V_{(i)}$ datapoint and two "neighboring" datapoint on either side, i.e. the $V_{(i-2)}$ datapoint, the $V_{(i-1)}$ datapoint, the $V_{(i+1)}$ datapoint, and the $V_{(i+2)}$ datapoint. Thus in the embodiment of TABLE IV, datapoint $V_{(i)avg}=(\frac{1}{5})(V_{(i-2)}+V_{(i-1)}+V_{(i)}+V_{(i+1)}+V_{(i+2)})$. For example where N=2, velocity datapoint $V_{(4)cal}$ is calculated by averaging 0.000, 0.000, 0.000, 2.000, and 4.000 to give a value of 1.200.

In other embodiments, step 1180 includes forming a filtered velocity profile using the first velocity profile of step 1110 and averaging the datapoints comprising that first velocity profile using equation (1) where N is greater than 2. In other embodiments, step 1180 includes forming a filtered velocity profile using the first velocity profile of step 1110 and averaging the datapoints comprising that first velocity profile using equation (2) where N is greater than or equal to 2. In certain embodiments, step 1180 includes using higher order Butterworth filters, i.e. n>3, to give additional "smoothing" of Applicants' first velocity profile. In certain embodiments, step 1180 includes using a Butterworth filter having a cutoff frequency greater than about 15 hertz. Such additional smoothing further decreases the instantaneous velocity changes, and thereby, further minimizes undesirable accessor vibration/oscillation.

Figure 7:
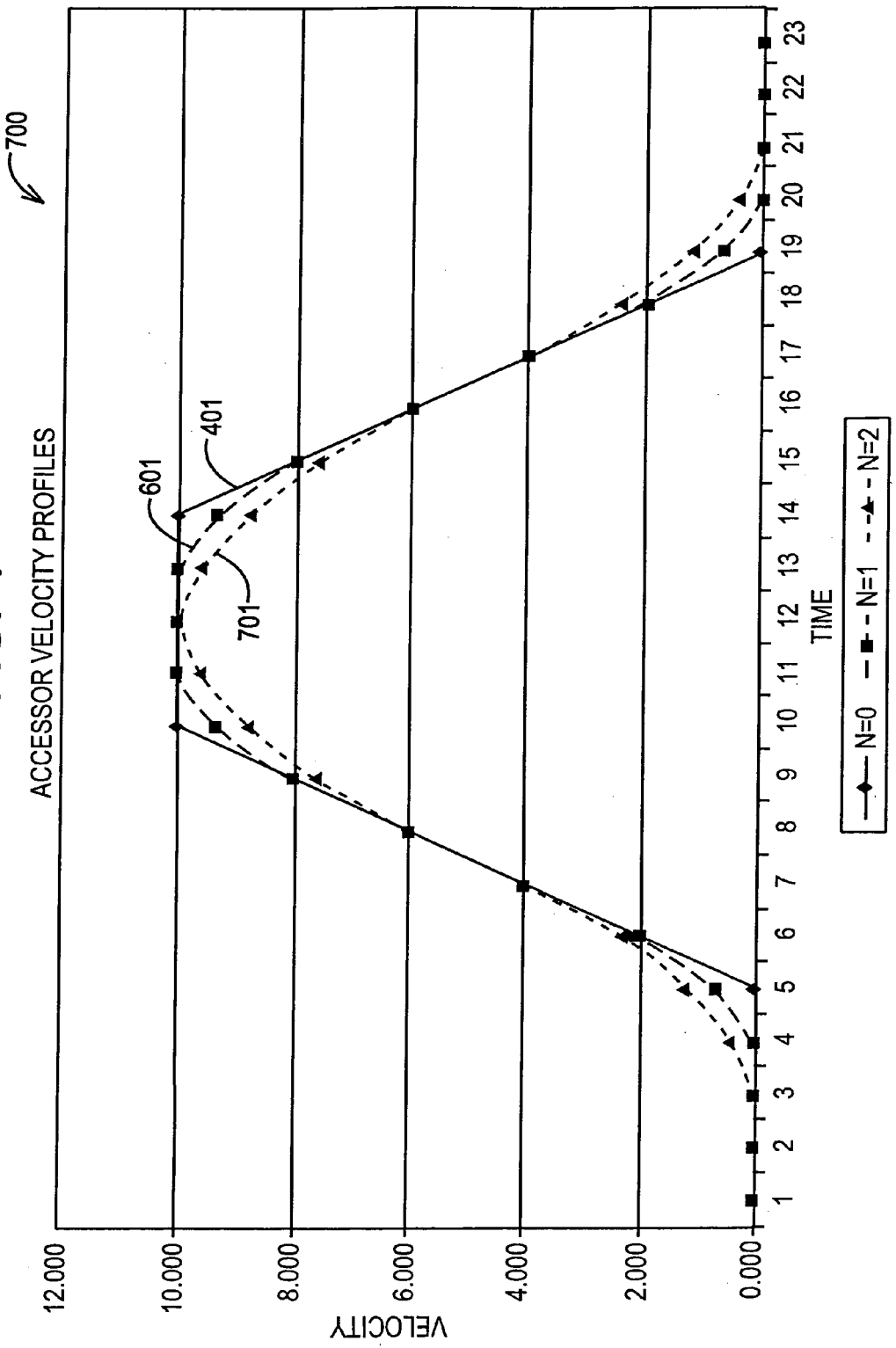
FIG. 7 is a graph showing Applicants' first velocity profile, a first embodiment of Applicants' second velocity profile, and a first embodiment of Applicants' third velocity profile.

FIG. 7 comprises graph 700 which shows, curve 401 which graphically depicts Applicants' first velocity profile, curve 601 which graphically depicts Applicants' second velocity profile of TABLE II, and curve 701 which graphically depicts Applicants' third velocity profile of TABLE IV. As curve 701 shows, Applicants' third velocity profile comprises yet a further smoothing of the trapezoidal first velocity profile. In certain embodiments, Applicants' third velocity profile is formed by passing Applicants' first velocity profile through an nth order low pass Butterworth filter, where n is greater than 3.

Figure 8:
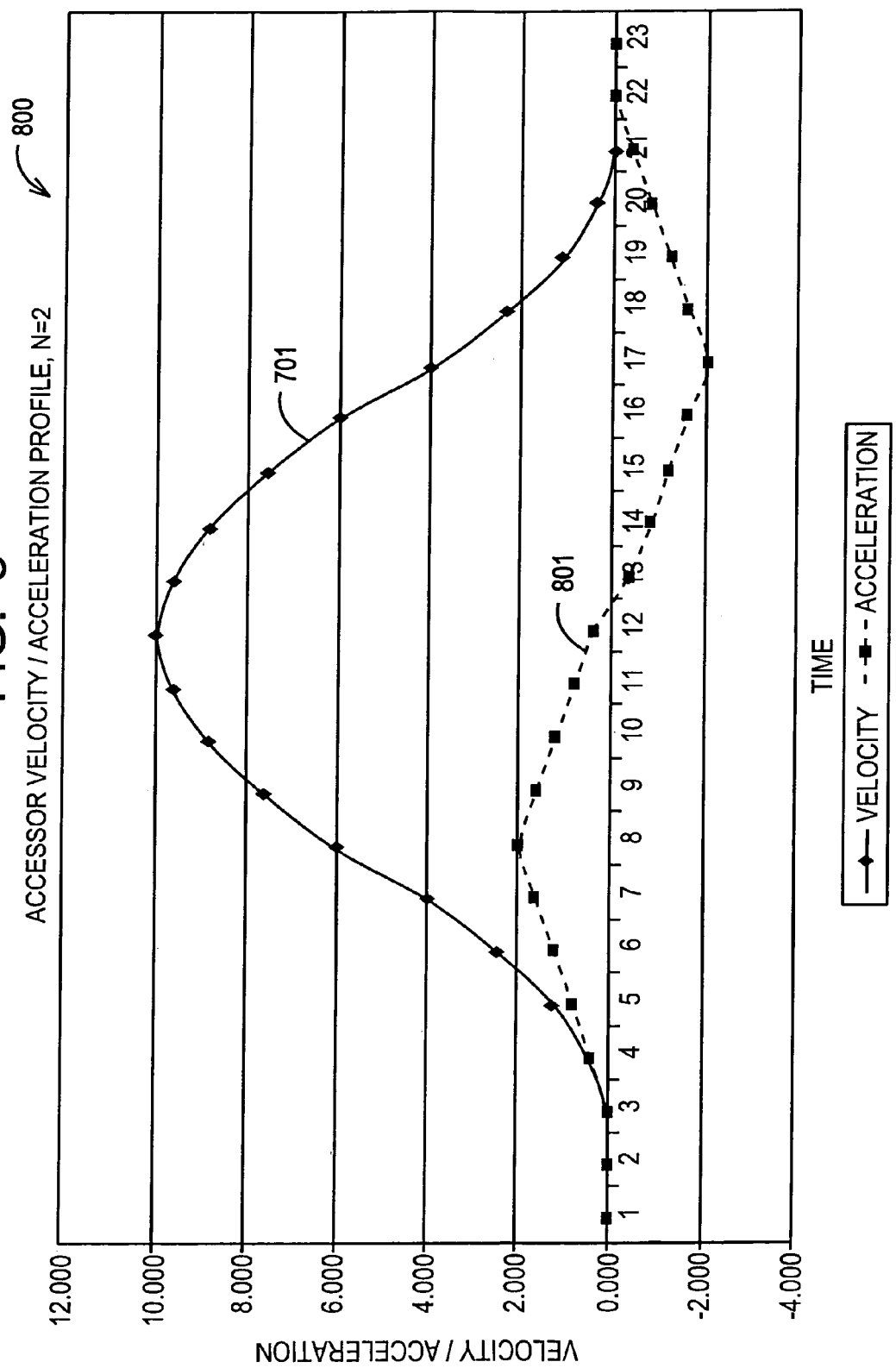
FIG. 8 is a graph showing a first embodiment of Applicants' third velocity profile and the corresponding acceleration profile.

FIG. 8 recites graph 800 which graphically depicts Applicants' third velocity profile, i.e. curve 701, and the corresponding acceleration profile 801. Comparing curves 501

(FIG. 5) and 801 (FIG. 8) clearly shows that Applicants' third velocity profile includes much smoother changes in acceleration than does Applicants' first velocity profile. Therefore, moving an accessor using Applicants' third velocity profile induces fewer accessor vibrations and/or oscillations. As those skilled in the art will appreciate, fewer accessor vibrations and/or oscillations results in a fewer accessor failures, a reduced maintenance schedule, and therefore, lower cost operation of the data storage and retrieval system.

Referring again to FIG. 13, curve 1330 shows the rate of change of acceleration, i.e. the jerk, using Applicants' third velocity profile of TABLE IV. An accessor using that third velocity profile has a third maximum rate of change of acceleration, i.e. 0.4/−0.4, where that third maximum rate of change of acceleration is less than either the second maximum rate of change of acceleration shown by curve 1320 or the first maximum rate of change of acceleration shown by curve 1310.

Using Applicants' first velocity profile requires using a first maximum rate of acceleration change as graphically depicted by curve 1310. Using Applicants' second velocity profile requires using a second maximum rate of acceleration change as graphically depicted by curve 1320. Using Applicants' third velocity profile requires using a third maximum rate of acceleration change as graphically depicted by curve 1330.

As those skilled in the art will appreciate, the area defined by curve portions 1332, 1334, 1336, and the X axis, equals the area defined by curve portions 1322, 1324, 1326, and the X axis. In addition, these areas are also equal to the area defined by spike 1312. Because curve 1312 is infinitely small i.e. because using Applicants' first velocity profile the acceleration changes instantaneously, the resulting maximum first acceleration change is infinitely large. The second maximum rate of acceleration change indicated by curve 1324 is less than the first maximum rate of acceleration change but necessarily greater than the third maximum rate of acceleration change indicated by curve 1334 because the second maximum rate of acceleration change is applied for a shorter period of time.

Referring again to FIG. 7, graph 700 shows that using Applicants' first velocity profile, represented by curve 401 (FIGS. 4, 5, 6, 7), the accessor travels from a first location to a second location over 14 time intervals, i.e. from time T$_5$ through time T$_{19}$. Applicants' second velocity profile, represented by curve 601 (FIGS. 6, 7), moves that accessor from that first location to that second location over 16 time intervals, i.e. from time T$_4$ through time T$_{20}$. Thus, Applicants' second velocity profile smoothes the abrupt velocity and acceleration changes of the first velocity profile while requiring about 14% additional transit time.

Applicants' third velocity profile, represented by curve 701 (FIG. 7) moves the accessor from the first location to the second location over 18 time intervals. As curve 701 shows, Applicants' third velocity profile further smoothes the abrupt velocity changes of Applicants' first velocity profile, but requires about 28% additional transit time. As described above, in certain embodiments of Applicants' invention where the accessor travels only a short distance, and where the accessor never reaches a$_{MAX}$ using Applicants' second velocity profile, that first velocity profile is used. In certain embodiments of Applicants' invention, an accessor is moved using Applicants' second velocity profile. In yet other embodiments where an accessor is moved using Applicants' third velocity profile.

Applicants' invention further includes an article of manufacture comprising a computer useable medium 352 (FIG. 3) having computer readable program code disposed therein for effectuating the steps recited in FIG. 11. Such an article of manufacture includes an accessor, such as accessor 110 (FIGS. 1, 2) and/or a data storage and retrieval system, such as system 100 (FIG. 1).

Applicants' invention further includes a computer program product 354 (FIG. 3) usable with a programmable computer processor having computer readable program code embodied therein for implementing the steps of FIG. 11. In certain embodiments, such a computer program product is disposed in a controller, such as controller 340, disposed on the accessor, such as accessor 110 (FIGS. 1, 2).

The embodiments of Applicants' method summarized in FIG. 11, may be implemented separately. For example, one embodiment may include steps 1105, 1110, 1120, 1130, 1160, and 1195. Another embodiment may utilize steps 1105, 1110, 1120, 1130, 1140, 1145, 1150, 1170, and 1195. Another embodiment may utilize steps 1105, 1110, 1120, 1130, 1140, 1145, 1150, 1180, 1190, and 1195. In certain embodiments, one or more individual steps recited in FIG. 11 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to move an accessor within a data storage and retrieval system, comprising the steps of:
   providing an accessor comprising a velocity control program, wherein said accessor is capable of traveling at a velocity V$_{MAX}$ and accelerating at a maximum acceleration a$_{MAX}$;
   receiving a request to move said accessor a distance from a first location to a second location;
   forming a first velocity profile wherein said accessor travels said distance in the minimum time interval, and wherein said first velocity profile requires a first maximum acceleration change;
   calculating a second velocity profile, wherein said second velocity profile includes a second maximum acceleration change, wherein said second maximum acceleration change is less than said first maximum acceleration change;
   determining if said accessor reaches a$_{MAX}$ using said second velocity profile;
   operative if said accessor does not reach a$_{MAX}$ using said second velocity profile, loading said first velocity profile into said velocity control program;
   operative if said accessor does reach a$_{MAX}$ using said second velocity profile, loading said second velocity profile into said velocity control program;
   moving said accessor using said velocity control program.

2. The method of claim 1, further comprising the steps of:
   forming a first acceleration profile using said first velocity profile;
   calculating said second velocity profile by passing said first acceleration profile through a low pass Butterworth filter having a cutoff frequency greater than or equal to 15 hertz.

3. The method of claim 1, further comprising the steps of:
calculating a plurality of first velocity datapoints $v_{(i)}$ based upon said distance, said $V_{MAX}$, and said $a_{MAX}$, wherein said first velocity profile comprises said plurality of first velocity datapoints;
averaging two or more of said first velocity datapoints $v_{(i)}$ to form each of a plurality of first averaged velocity datapoints $v_{(i)avg}$;
forming said second velocity profile using said plurality of first averaged velocity datapoints $v_{(i)avg}$.

4. The method of claim 3, further comprising the step of calculating each of said plurality of averaged velocity datapoints $v_{(i)avg}$ using the equation:

$$V_{(i)avg} = (1/(2N+1))(V_{(i-2N)} + V_{(i-(2N-1))} + V_{(i-(2N-2))} \cdots + V_{(i)}),$$

wherein N is greater than or equal to 1.

5. The method of claim 3, further comprising the step of calculating each of said plurality of first averaged velocity datapoints $v_{(i)avg}$ using the equation:

$$V_{(i)avg} = (1/(2N+1))(V_{(i-N)} + V_{(i-(N-1))} \cdots + V_{(i)} \cdots + V_{(i+(N-1))} + V_{(i+(N))}),$$

wherein N is greater than or equal to 1.

6. The method of claim 1, further comprising the steps of:
receiving a request to transport an object;
setting a threshold moment arm for said accessor;
calculating an actual moment arm for said accessor carrying said object;
determining if said actual moment arm exceeds said threshold moment arm;
operative if said actual moment arm exceeds said threshold moment arm, calculating a third velocity profile, wherein said third velocity profile includes a third maximum acceleration change, wherein said third maximum acceleration change is less than said second maximum acceleration change.

7. The method of claim 6, further comprising the steps of:
forming a first acceleration profile using said first velocity profile;
calculating said third velocity profile by passing said first acceleration profile through a low pass nth order Butterworth filter having a cutoff frequency less than about 15 hertz, wherein n is greater than or equal to 3.

8. The computer program product of claim 6, further comprising:
computer readable program code which causes said programmable computer processor to form a first acceleration profile using said first velocity profile; and
computer readable program code which causes said programmable computer processor to form said third velocity profile by passing said first acceleration profile through a low pass nth order Butterworth filter having a cutoff frequency less than about 15 hertz, wherein n is greater than 3.

9. The method of claim 6, further comprising the steps of:
calculating a plurality of first velocity datapoints $v_{(i)}$ based upon said distance, said $V_{MAX}$, and said $a_{MAX}$, wherein said first velocity profile comprises said plurality of first velocity datapoints;
averaging three or more of said first velocity datapoints $v_{(i)}$ to form each of a plurality of second averaged velocity datapoints $v_{(i)avg}$;
forming said third velocity profile using said plurality of second averaged velocity datapoints $v_{(i)avg}$.

10. The method of claim 9, further comprising the step of calculating each of said plurality of second averaged velocity datapoints $v_{(i)avg}$ using the equation:

$$V_{(i)avg} = (1/(2N+1))(V_{(i-N)} + V_{(i-(N-1))} \cdots + V_{(i)} \cdots + V_{(i+(N-1))} + V_{(i+(N))}),$$

wherein N is greater than or equal to 2.

11. The method of claim 9, further comprising the step of calculating each of said plurality of second averaged velocity datapoints $v_{(i)avg}$ using the equation:

$$V_{(i)avg} = (1/(2N+1))(V_{(i-2N)} + V_{(i-(2N-1))} + V_{(i-(2N-2))} \cdots + V_{(i)}),$$

wherein N is greater than or equal to 2.

12. An article of manufacture comprising a computer useable medium having computer readable program code disposed therein for moving an accessor from a first location to a second location within a data storage and retrieval system, wherein said accessor comprises a velocity control program, and wherein said accessor is capable of traveling at a velocity $V_{MAX}$ and accelerating at a maximum acceleration $a_{MAX}$, the computer readable program code comprising a series of computer readable program steps to effect:
receiving a request to move said accessor a distance from a first location to a second location;
forming a first velocity profile wherein said accessor travels said distance in the minimum time interval, and wherein said first velocity profile requires a first maximum acceleration change;
calculating a second velocity profile, wherein said second velocity profile includes a second maximum acceleration change, wherein said second maximum acceleration change is less than said first maximum acceleration change;
determining if said accessor reaches $a_{MAX}$ using said second velocity profile;
operative if said accessor does not reach $a_{MAX}$ using said second velocity profile, loading said first velocity profile into said velocity control program;
operative if said accessor does reach $a_{MAX}$ using said first velocity profile, loading said second velocity profile into said velocity control program;
moving said accessor using said velocity control program.

13. The article of manufacture of claim 12, the computer readable program code comprising a series of computer readable program steps to effect:
forming a first acceleration profile using said first velocity profile;
calculating said second velocity profile by passing said first acceleration profile through a low pass Butterworth filter having a cutoff frequency greater than or equal to about 15 hertz.

14. The article of manufacture of claim 12, the computer readable program code comprising a series of computer readable program steps to effect:
calculating a plurality of first velocity datapoints $v_{(i)}$ based upon said distance, said $V_{MAX}$, and said $a_{MAX}$, wherein said first velocity profile comprises said plurality of first velocity datapoints;
averaging two or more of said first velocity datapoints $v_{(i)}$ to form each of a plurality of first averaged velocity datapoints $v_{(i)avg}$;
forming said second velocity profile using said plurality of first averaged velocity datapoints $v_{(i)avg}$.

15. The article of manufacture of claim 14, the computer readable program code comprising a series of computer readable program steps to effect calculating each of said plurality of first averaged velocity datapoints $v_{(i)avg}$ using the equation:

$$V_{(i)avg}=(1/(2N+1))(V_{(i-N)}+V_{(i-(N-1))} \cdots +V_{(i)} \cdots +V_{(i+(N-1))}+V_{(i+(N))}),$$

wherein N is greater than or equal to 1.

16. The article of manufacture of claim 14, the computer readable program code comprising a series of computer readable program steps to effect calculating each of said plurality of averaged velocity datapoints $v_{(i)avg}$ using the equation:

$$V_{(i)avg}=(1/(2N+1))(V_{(i-2N)}+V_{(i-(2N-1))}+V_{(i-(2N-2))} \cdots +V_{(i)}),$$

wherein N is greater than or equal to 1.

17. The article of manufacture of claim 12, the computer readable program code comprising a series of computer readable program steps to effect:
receiving a request to transport an object;
setting a threshold moment arm for said accessor;
calculating an actual moment arm for said accessor carrying said object;
determining if said actual moment arm exceeds said threshold moment arm;
operative if said actual moment arm exceeds said threshold moment arm, calculating a third velocity profile, wherein said third velocity profile includes a third maximum acceleration change, wherein said third maximum acceleration change is less than said second maximum acceleration change.

18. The article of manufacture of claim 17, the computer readable program code comprising a series of computer readable program steps to effect:
forming a first acceleration profile using said first velocity profile;
calculating said third velocity profile by passing said first acceleration profile through a low pass nth order Butterworth filter having a cutoff frequency less than about 15 hertz, wherein n is greater than or equal to 3.

19. The article of manufacture of claim 17, the computer readable program code comprising a series of computer readable program steps to effect:
calculating a plurality of first velocity datapoints $v_{(i)}$ based upon said distance, said $V_{MAX}$, and said $a_{MAX}$, wherein said first velocity profile comprises said plurality of first velocity datapoints;
averaging three or more of said first velocity datapoints $v_{(i)}$ to form each of a plurality of second averaged velocity datapoints $v_{(i)avg}$;
forming said third velocity profile using said plurality of second averaged velocity datapoints $v_{(i)avg}$.

20. The article of manufacture of claim 19, the computer readable program code comprising a series of computer readable program steps to effect calculating each of said plurality of second averaged velocity datapoints $v_{(i)avg}$ using the equation:

$$V_{(i)avg}=(1/(2N+1))(V_{(i-N)}+V_{(i-(N-1))} \cdots +V_{(i)} \cdots +V_{(i+(N-1))}+V_{(i+(N))}),$$

wherein N is greater than or equal to 2.

21. The article of manufacture of claim 19, the computer readable program code comprising a series of computer readable program steps to effect calculating each of said plurality of second averaged velocity datapoints $v_{(i)avg}$ using the equation:

$$V_{(i)avg}=(1/(2N+1))(V_{(i-2N)}+V_{(i-(2N-1))}+V_{(i-(2N-2))} \cdots +V_{(i)}),$$

wherein N is greater than or equal to 2.

22. A computer program product usable with a programmable computer processor having computer readable program code embodied therein for moving an accessor from a first location to a second location within a data storage and retrieval system, wherein said accessor is capable of traveling at a velocity $V_{MAX}$ and accelerating at a maximum acceleration $a_{MAX}$, comprising:
computer readable program code which causes said programmable computer processor to receive a request to move said accessor a distance from a first location to a second location;
computer readable program code which causes said programmable computer processor to form a first velocity profile wherein said accessor travels said distance in the minimum time interval, and wherein said first velocity profile requires a first maximum acceleration change;
calculate a second velocity profile, wherein said second velocity profile includes a second maximum acceleration change, wherein said second maximum acceleration change is less than said first maximum acceleration change;
computer readable program code which causes said programmable computer processor to determine if said accessor reaches $a_{MAX}$ using said second velocity profile;
computer readable program code which, if said accessor does not reach $a_{MAX}$ using said second velocity profile, causes said programmable computer processor to load said first velocity profile into said velocity control program;
computer readable program code which, if said accessor does reach $a_{MAX}$ using said second velocity profile, causes said programmable computer processor to load said second velocity profile into said velocity control program; and
computer readable program code which causes said programmable computer processor to move said accessor using said velocity control program.

23. The computer program product of claim 22, further comprising:
computer readable program code which causes said programmable computer processor to form a first acceleration profile using said first velocity profile; and
computer readable program code which causes said programmable computer processor to calculate said second velocity profile by passing said first acceleration profile through a low pass Butterworth filter having a cutoff frequency greater than or equal to 15 hertz.

24. The computer program product of claim 22, further comprising:
computer readable program code which causes said programmable computer processor to calculate a plurality of first velocity datapoints $v_{(i)}$ based upon said distance, said $V_{MAX}$, and said $a_{MAX}$;
computer readable program code which causes said programmable computer processor to average two or more of said first velocity datapoints $v_{(i)}$ to form each of a plurality of first averaged velocity datapoints $v_{(i)avg}$;
computer readable program code which causes said programmable computer processor to calculate said second velocity profile using said plurality of first averaged velocity datapoints $v_{(i)avg}$.

25. The computer program product of claim 22, further comprising computer readable program code which causes said programmable computer processor to calculate each of said plurality of first averaged velocity datapoints $v_{(i)avg}$ using the equation:

$$V_{(i)avg}=(1/(2N+1))(V_{(i-N)}+V_{(i-(N-1))} \cdots +V_{(i)} \cdots +V_{(i+(N-1))}+V_{(i+(N))}),$$

wherein N is greater than or equal to 1.

26. The computer program product of claim 24, further comprising computer readable program code which causes said programmable computer processor to calculate each of said plurality of averaged velocity datapoints $V_{(i)avg}$ using the equation:

$$V_{(i)avg}=(1/(2N+1))(V_{(i-2N)}+V_{(i-(2N-1))}+V_{(i-(2N-2))} \cdots +V_{(i)}),$$

wherein N is greater than or equal to 1.

27. The computer program product of claim 22, further comprising:
    computer readable program code which causes said programmable computer processor to receive a request to transport an object;
    computer readable program code which causes said programmable computer processor to retrieve a predetermined threshold moment arm for said accessor;
    computer readable program code which causes said programmable computer processor to calculating an actual moment arm for said accessor carrying said object;
    computer readable program code which causes said programmable computer processor to determining if said actual moment arm exceeds said threshold moment arm;
    computer readable program code which causes said programmable computer processor to operative if said actual moment arm exceeds said threshold moment arm, calculating a third velocity profile, wherein said third velocity profile includes a third maximum acceleration change, wherein said third maximum acceleration change is less than said second maximum acceleration change.

28. The computer program product of claim 27, further comprising:
    computer readable program code which causes said programmable computer processor to calculate a plurality of first velocity datapoints $v_{(i)}$ based upon said distance, said $V_{MAX}$, and said $a_{MAX}$;
    computer readable program code which causes said programmable computer processor to average three or more of said first velocity datapoints $v_{(i)}$ to form each of a plurality of second averaged velocity datapoints $v_{(i)avg}$;
    computer readable program code which causes said programmable computer processor to form said third velocity profile using said plurality of second averaged velocity datapoints $v_{(i)avg}$.

29. The computer program product of claim 28, further comprising computer readable program code which causes said programmable computer processor to calculate each of said plurality of second averaged velocity datapoints $v_{(i)avg}$ using the equation:

$$V_{(i)avg}=(1/(2N+1))(V_{(i-N)}+V_{(i-(N-1))} \cdots +V_{(i)} \cdots +V_{(i+(N-1))}+V_{(i+(N))}),$$

wherein N is greater than or equal to 2.

30. The computer program product of claim 28, further comprising computer readable program code which causes said programmable computer processor to calculate each of said plurality of second averaged velocity datapoints $v_{(i)avg}$ using the equation:

$$V_{(i)avg}=(1/(2N+1))(V_{(i-2N)}+V_{(i-(2N-1))}+V_{(i-(2N-2))} \cdots +V_{(i)}),$$

wherein N is greater than or equal to 2.

* * * * *